(12) United States Patent
Diakoumakos et al.

(10) Patent No.: US 8,450,413 B2
(45) Date of Patent: May 28, 2013

(54) NON-ISOCYANATE-BASED POLYURETHANE AND HYBRID POLYURETHANE-EPOXY NANOCOMPOSITE POLYMER COMPOSITIONS

(75) Inventors: Constantinos D. Diakoumakos, Trumpington (GB); Dimiter Lubomirov Kotzev, Northants (GB)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 0 days.

(21) Appl. No.: 13/397,015

(22) Filed: Feb. 15, 2012

(65) Prior Publication Data

US 2012/0149842 A1  Jun. 14, 2012

Related U.S. Application Data

(63) Continuation of application No. 10/567,945, filed as application No. PCT/EP2004/051796 on Aug. 13, 2004, now Pat. No. 8,143,346.

(30) Foreign Application Priority Data

Aug. 13, 2003  (EP) .................................... 03255011

(51) Int. Cl.
 *C08G 18/63* (2006.01)
 *C08F 2/44* (2006.01)

(52) U.S. Cl.
 USPC .......................................... 524/700; 524/849

(58) Field of Classification Search
 USPC .................................. 524/700, 849
 See application file for complete search history.

(56) References Cited

U.S. PATENT DOCUMENTS

| | | |
|---|---|---|
| 3,072,613 A | 1/1963 | Whelan et al. |
| 3,756,984 A | 9/1973 | Klarena et al. |
| 3,827,869 A | 8/1974 | Wulf von Bonin |
| 4,066,625 A | 1/1978 | Bolger |
| 4,268,656 A | 5/1981 | Ray-Chaudhuri et al. |
| 4,360,649 A | 11/1982 | Kamio et al. |
| 4,366,204 A | 12/1982 | Briggs |
| 4,542,202 A | 9/1985 | Takeuchi et al. |
| 4,546,155 A | 10/1985 | Hirose et al. |
| 4,699,974 A | 10/1987 | Evans |
| 4,758,615 A | 7/1988 | Engel et al. |
| 5,134,239 A | 7/1992 | Bertram et al. |
| 5,175,231 A | 12/1992 | Rappoport et al. |
| 5,340,889 A | 8/1994 | Crawford et al. |
| 5,407,978 A | 4/1995 | Bymark et al. |
| 5,430,112 A | 7/1995 | Sakata et al. |
| 5,439,977 A | 8/1995 | Yolota et al. |
| 5,464,910 A | 11/1995 | Nakatsuka et al. |
| 5,543,486 A | 8/1996 | Abe et al. |
| 5,548,058 A | 8/1996 | Muroi et al. |
| 5,717,011 A | 2/1998 | Griggs et al. |
| 5,733,954 A | 3/1998 | McKenzie et al. |
| 5,789,498 A | 8/1998 | Ohnishi et al. |
| 5,798,399 A | 8/1998 | Griggs et al. |
| 5,801,218 A | 9/1998 | McKenzie et al. |
| 5,847,027 A | 12/1998 | Marten et al. |
| 6,120,905 A | 9/2000 | Figovsky |
| 6,197,849 B1 | 3/2001 | Zilg et al. |
| 6,300,049 B2 | 10/2001 | Eichorst et al. |
| 6,403,670 B1 | 6/2002 | Ishidoya et al. |
| 6,407,198 B1 | 6/2002 | Figovsky et al. |
| 6,471,843 B2 | 10/2002 | December et al. |
| 6,495,637 B2 | 12/2002 | Rappoport |
| 6,610,774 B2 | 8/2003 | Maekawa et al. |
| 7,166,656 B2 | 1/2007 | Majumdar et al. |

FOREIGN PATENT DOCUMENTS

| | | |
|---|---|---|
| EP | 1 070 733 | 1/2001 |
| SU | 1 754 748 | 8/1992 |

OTHER PUBLICATIONS

Figovsky, et al., "Nonisocyanate Polyurethanes for Adhesives and Coatings", Conference Proceedings article, pp. 257-264, Oct. 21, 2001.
Chen T.K. et al., "Synthesis and Characterization of Novel Segmented Polyurethane/Clay Nanocomposite via Poly($\epsilon$-caprolactone)/Clay", Journal of Polymer Science, Polymer Chemistry ed., vol. 37 No. 13, pp. 2225-2233, Jul. 1, 1999.
Zilg C, et al., "Polyurethane Nanocomposites Containing Laminated Anisotropic Nanoparticles Derived from Organophilic Layered Silicates", Advanced Materials, VCH Verlagsgesellschaft, Weinheim DE, vol. 11 No. 1, pp. 49-52, Jan. 7, 1999.

*Primary Examiner* — Mark Eashoo
*Assistant Examiner* — Megan McCulley

(57) ABSTRACT

A fast curable non-isocyanate-based polyurethane- and polyurethane-epoxy network nanocomposite polymeric compositions are derived upon crosslinking a mixture comprising of natural or modified nano-clay [ionic phyllosilicate] with platelet thickness in the scale of Å (~1 nm) and aspect ratio (length/thickness) higher than 10 (nm)] preferably natural or modified montmorillonite with either a monomer(s) or oligomer(s) bearing at least one cyclocarbonate group or a mixture of the latter with an epoxy resin, with a hardener, which is a monomer or oligomer or mixtures therefrom, bearing primary and/or secondary amino groups. The use of the nano-clays reduces the gel time and increases the adhesion of the cured polyurethane and polyurethane/epoxy hybrid and also reduces its water absorption.

13 Claims, 5 Drawing Sheets

MY-0510
(represented as monomer)

MY-0500CC
(represented as monomer)

L-803

NON-ISOCYANATE-BASED POLYURETHANE AND HYBRID POLYURETHANE-EPOXY NANOCOMPOSITE POLYMER COMPOSITIONS

CROSS REFERENCE TO RELATED APPLICATIONS

This application is a continuation of U.S. patent application Ser. No. 10/567,945, currently pending, which is the National Phase of International Application PCT/EP2004/051796 filed Aug. 13, 2004 which designated the U.S. and which claims priority to European (EP) Pat. App. No. 03255011.3 filed Aug. 13, 2003. The noted applications are incorporated herein by reference

TECHNICAL FIELD

The present invention relates to polyurethane and polyurethane/epoxy compositions and to methods of their manufacture.

BACKGROUND ART

Processes and materials that are, or are suspected to be, ecologically damaging are increasingly unacceptable and alternative ecologically safer solutions are demanded. Conventionally, polyurethanes are manufactured by the reaction of organic materials containing two or more hydroxyl groups with other organic materials (monomers, dimers, trimers and oligomers) containing two or more isocyanate groups. Such isocyanates are highly toxic and are produced from by an even more toxic starting material, phosgene. Secondly, polyurethane production is prone to an undesirable side-reaction between the isocyanate groups and moisture, which yields carbon dioxide within the polyurethane mass, resulting in bubbles of carbon dioxide being trapped in the finished material, causing the polyurethane to be porous. Conventional polyurethanes are unstable in the presence of water and have a poor chemical resistance to aqueous solutions of acids and alkalis, which limits their use.

A series of relatively recent patents disclose polyurethane or polyurethane-epoxy hybrid compositions based on the reaction between, on the one hand, oligomer(s) bearing cyclocarbonate groups or both epoxy groups and cyclocarbonate groups and, on the other hand, amines. More particularly, U.S. Pat. No. 5,340,889 discloses a method for producing linear non-isocyanate polyurethanes from the reaction of cyclocarbonate derivatives and amines.

SU-1,754,748 deals with an epoxy-based composite material for flooring applications that includes an oligomeric cyclocarbonate modifier with a monofunctional hardener (aminophenol) for the modifier, resulting in an epoxy-based material with immobilized non-isocyanate oligo-urethane moieties.

U.S. Pat. No. 5,175,231 and U.S. Pat. No. 6,495,637 disclose a multi-step process for the preparation of a network comprising non-isocyanate polyurethane links for use as a hardener for epoxy resins.

U.S. Pat. No. 4,785,615 discloses polymer compositions containing urethane groups that are capable of being crosslinked by crosslinking agents, prepared without the use of isocyanates by reacting polyamino compounds with polycarbonates and if appropriate, reacting the product further with polycarboxylic acids to form a series of products intended for use as adhesives and paints, especially aqueous baking paint formulations and aqueous curable paints that can be deposited by anaphoresis.

U.S. Pat. No. 6,120,905 discloses hybrid non-isocyanate network polyurethanes formed by crosslinking at least one cyclocarbonate oligomer with an average functionality of from about 2.0 to about 5.44 and at least one of these cyclocarbonate oligomers consists from about 4 to about 12% w/w of terminal epoxy groups, with one amine oligomer. The patent also relates to methods of making hybrid non-isocyanate polyurethane networks for use in composite materials containing a fibre reinforcement (glass fibre, carbon fibre, basalt fibre and mixtures thereof), or a particulate reinforcement, e.g. a metal oxide or a metal aluminate salt.

EP-1,020,457 and U.S. Pat. No. 6,407,198 relate to the synthesis of polyfunctional polycyclocarbonate oligomers. The polycyclocarbonates are prepared by the reaction of oligocyclocarbonates containing terminal epoxy groups with primary aromatic diamines and they were used for the preparation of hybrid materials for adhesives, sealants, composite materials, coatings or synthetic leather. It is mentioned that pigments and fillers (e.g. barium sulphate, titanium dioxide, silica, aluminate cement and ferrous oxides pigments) can be also added in the preparation of adhesives compositions EP-1,070,733 relates to the synthesis of polyaminofunctional hydroxyurethane oligomers and hybrids prepared therefrom. It states that it is impossible to form composite polyurethane/epoxy resins by curing a composition containing both epoxy groups and cyclocarbonate groups with a hardener containing primary amine groups because of the competition between the epoxy and cyclocarbonate groups for reaction with the primary amines. It therefore proposes a curable composition containing an oligomer containing both a cyclocarbonate ring and an epoxy ring.

Micheev V. V. et al. report (Lakokrasochnye Materialy I Ikh Primenenie, 1985, 6, 27-30) that co-curing of oligomeric cyclocarbonate resins and epoxies with polyamines yields products with enhanced properties over monolithic non-isocyanate-based polyurethanes but they do not include any comparative example in their study.

In 1990, researchers at TOYOTA Central Research & Development Laboratories (Japan) [a] Fukushima, Y. et all., *J. Inclusion Phenom.*, 1987, 5, 473, b] Fukushima, Y. et all., *Clay Miner.*, 1988, 23, 27, c] Usuki, A. et all., *J. Mater. Res.*, 1993, 8, 1174, d] Yano K. et all., *J. Polym. Sci. Part A: Polymer Chem.*, 1993, 31, 2493, e) Kojima, Y. et all., *J. Polym. Sci. Part A: Polymer Chem.*, 1993, 31, 983] disclosed the enhancement in mechanical properties of nylon-clay nanocomposites.

Researchers have concentrated on four nanoclays as potential nanoscale particles: a) hydrotalcite, b) octasilicate, c) mica fluoride and d) montmorillonite. The first two have limitations both from a physical and a cost standpoint. The last two are used in commercial nanocomposites. Mica fluoride is a synthetic silicate, montmorillonite (MMT) is a natural one. The theoretical formula for montmorillonite is:

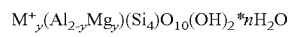

$$M^+{}_y(Al_{2-y}Mg_y)(Si_4)O_{10}(OH)_2 \cdot nH_2O$$

Ionic phyllosilicates have a sheet structure. At the Angstrom scale, they form platelets, which are 0.7-1 nm thick and several hundred nanometers (about 100-1000 nm) long and wide. As a result, individual sheets have aspect ratios (Length/Thickness, L/T) varying from 200-1000 or even higher and, after purification, the majority of the platelets have aspect ratios in the 200-400 range. In other words, these sheets usually measure approximately 200×1 nm (L×T). These platelets are stacked into primary particles and these primary particles are stacked together to form aggregates (usually about 10-30 μm in size). The silicate layers form stacks with a gap in between them called the "interlayer" or "gallery". Isomorphic substitution within the layers ($Mg^{2+}$ replaces $Al^{3+}$) generates negative charges that are counterbalanced by alkali or alkaline earth cations situated in the interlayer. Such clays are not necessarily compatible with polymers since, due to their small size, surface interactions such as hydrogen bonding become magnified. Thus, the ability to disperse the clays within some resins is limited and at the beginning, only hydrophilic polymers (e.g. PVA) were compatible with the clays because silicate clays are naturally hydrophilic. But, it was found that the inorganic cations situated in the interlayer can be substituted by other cations. Cationic exchange with large cationic surfactants such as alkyl ammonium-ions, increases the spacing between the layers and reduces the surface energy of the filler. Therefore, these modified clays (organoclays) are more compatible with polymers and form polymer-layered silicate nanocomposites. Various companies (e.g. Southern Clays (of 1212 Church Street, Gonzales, Tex. USA 8629), Sud Chemie, Nanocor, etc.) provide a whole series of both modified and natural nano clays, which are montmorillonites. Apart from montmorillonites, hectorites and saponites are the most commonly used layered silicates.

A nanocomposite is a dispersion, often a near-molecular blend, of resin molecules and nanoscale particles. Nanocomposites can be formed in one of the following three ways: a) melt blending synthesis, b) solvent based synthesis and c) in-situ polymerization, as is known in the art.

There are three structurally different types of nanocomposites: 1) intercalated (individual monomers and polymers are sandwiched between silicate layers) 2) exfoliated (a "sea" of polymer with "rafts" of silicate), and 3) end-tethered (a whole silicate or a single layer of a silicate is attached to the end of a polymer chain).

Glass transition temperature is a fundamentally important property of polymers since it is the temperature at which properties of the polymer change radically. In some instances, it is desirable to have a high glass transition temperature for a polyurethane polymer.

Gel time is also an important production parameter and fast gel times allow a polymer to be manufactured or formed more rapidly. Gel times and cure times are obviously related and both will be referred to in the present specification. In addition, fast cure times allow adhesives to set quickly to produce the desired bond.

DISCLOSURE OF THE INVENTION

The present invention provides a composition for forming a non-isocyanate-based polyurethane- and polyurethane-epoxy network nanocomposite polymeric composition, comprising the following components:
(a) a polymerisable organic material that bears at least one cyclocarbonate group or a mixture thereof;
(b) a natural or synthetic, modified or unmodified nano-clay [ionic phyllosilicate] with a platelet thickness of less than 25 Å (~2.5 nm), more preferable less than 10 Å (~1 nm), and most preferably between 4-8 Å (~0.5-0.8 nm) and an aspect ratio (length/thickness) higher than 10, more preferably higher than 50 and most preferably higher than 100 or a mixture thereof or a nanocomposite formed from such a nano-clay or nano-clay mixture; preferably the nano-clay is a natural or modified montmorillonite; and
(c) at least one hardener for component (a), which preferably is a primary and/or secondary amine or a mixture thereof.

The composition optionally also includes, as a further component (d), a compound containing one or more epoxy group.

Component (a) can be monomer or a dimer or oligomer, i.e. any compound that can be polymerised with itself or with another molecule to form a chain or network containing of monomer units.

As used herein the term "nanoclay" means a natural or synthetic, modified or unmodified ionic phyllosilicate with a platelet structure, the platelets being separable from each other on incorporation into the above composition and having a thickness of less than 25 Å (~2.5 nm), more preferable less than 10 Å (~1 nm), and most preferably between 4-8 Å (~0.5-0.8 nm) and an aspect ratio (length/thickness) higher than 10:1. A nanocomposite is a blend of resin molecules and a nano-clay, as discussed above. A modified nanoclay is a natural nanoclay that has been subject to a cation exchange reaction of the intergallery cations.

The incorporation of the nanoclays and nanocomposites has, as is evident from the discussions below, a beneficial effect on the speed of gelling and cure time even if the platelets are not separated and so the present invention is not limited to the platelets being separated and dispersed through the composition. However, it is preferred that the platelets separated and dispersed since that provides beneficial improvement in the physical properties such as water uptake and strength as well as improved gel time. The preferred methods for dispersion of the nano-clay is sonification or high-shear mixing. The present invention can use all of types 1 to 3 of nanocomposites discussed above.

Component (a) is preferably a compound of the general formula:

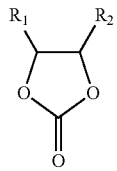

where $R_1$ and $R_2$ can each independently be hydrogen, or a linear, branched, cyclic (aromatic/heteroaromatic/cycloaliphatic), saturated or unsaturated (e.g. vinyl, (meth)acrylate moieties, etc.) group and can also contain heteroatoms (e.g. silicon) or more preferably oxygen-containing groups (e.g. terminal or linking further 1,3-dioxolan-2-one rings, epoxy rings, or ester, ether, carboxyl groups, or hydroxy) and/or nitrogen (e.g. terminal or linking amino, imino, tertiary coordinated nitrogen).

The polymerisable cyclocarbonate-containing organic material may be prepared by reacting an organic material containing an epoxy group via a cyclocarbonation reaction with carbon dioxide and a catalyst, e.g. tetraethylammonium bromide. Preferred cyclocarbonates are those presented in FIG. 6 and which may also include different percentages of cyclocarbonate groups. However the cyclocarbonate component (a) may be any molecule that can be derived from an epoxy-containing compound that has been subject to cyclocarbonation, e.g. an epoxy resin component (d) discussed below. Indeed, component (d) may be residual epoxy resin remaining form partial cyclocarbonation of an epoxy resin to form component (a).

Resins presenting both cyclocarbonate and epoxy functionalities are useful in the present invention; they are known in the art and are described for example in U.S. Pat. No. 5,175,231 and EP1070733. Such mixed functionality resins may be formed by the incomplete cyclocarbonation of a polyepoxy resin, i.e. some but not all the epoxide rings are reacted with carbon dioxide to form cyclocarbonate rings.

Cyclocarbonate resins are widely known in the art; see for example U.S. Pat. No. 5,175,231, U.S. Pat. No. 6,495,637, U.S. Pat. Nos. 5,340,889, 6,120,905, U.S. Pat. No. 4,699,974, U.S. Pat. No. 3,072,613, U.S. Pat. No. 6,407,198 U.S. Pat. No. 4,758,615, U.S. Pat. No. 6,120,905, EP-1020457 and EP1070733 and any of the cyclocarbonates described therein can be used in the present invention.

The hardener (reactant (c)) may be any chemical materials known in the art for curing cyclocarbonate resin component (a) and, when present, epoxy component (d). Such materials are sometimes referred to as curatives, curing agents or activators and are incorporated into the thermoset polymeric network formed by condensation, chain-extension and/or crosslinking of the cyclocarbonate and, when present, epoxy resins. Catalysts and/or accelerators can also be added to promote curing by catalytic action. Preferably the hardener contains two or more primary or secondary amine groups, although primary amines are preferred. Thus they may be, for example, aliphatic, aromatic, cycloaliphatic di- or polyamines. The hardener may be a polyaminofunctional hydroxyurethane oligomer, i.e. an amino-terminated adduct resulting from the reaction of a molecule containing a cyclocarbonate or epoxy group with a polyamine. Preferably, the amine groups in the hardener are not directly connected to an aromatic ring.

The hardener may be an amine terminated amine-epoxy adduct, that is to say an adduct between one or more molecules containing an epoxy ring and one or more compounds containing two or more amine groups such that there is a stoichiometric excess of amine groups so that the amine groups are available for curing component (a) and/or (d). Carboxylic acid anhydrides, carboxylic acids, phenolic novolac resins, thiols (mercaptans), water, metal salts and the like may also be utilized as additional reactants in the preparation of the amine-epoxy adduct or to further modify the adduct once the amine and epoxy have been reacted.

Amine epoxy adducts forming component (a) or (c) are well known in the art, see e.g. U.S. Pat. Nos. 3,756,984, 4,066,625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety.

The composition optionally also includes a further component (d) in the form of a compound containing one or more epoxy group. Instead of providing a separate epoxy component (d), an epoxy group may be included in component (a) (the organic material containing the cyclocarbonate group). A hardener for the epoxy groups should also be provided in the composition, the epoxy hardener is preferably the same as the hardener for the cyclocarbonate component (a), i.e. component (c) or may be any other known hardener for an epoxy system.

The epoxy resin may be any thermosettable resin having an average of more than one (preferably, about two or more) epoxy groups per molecule. Epoxy resins are well-known in the art and are described, for example, in the chapter entitled "Epoxy Resins" in the Second Edition of the Encyclopedia of Polymer Science and Engineering, Volume 6, pp. 322-382 (1986). Suitable epoxy resins include polyglycidyl ethers obtained by reacting polyhydric phenols such as bisphenol A, bisphenol F, bisphenol AD, catechol, or resorcinol, or polyhydric aliphatic alcohols such as glycerin, sorbitol, pentaerythritol, trimethylol propane and polyalkylene glycols with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins.

Component (d) may be an epoxy-terminated amine-epoxy adduct, that is to say an adduct between one or more molecules containing at least two epoxy rings and one or more compounds containing at least one amine groups such that there is a stoichiometric excess of the epoxy rings so that they are available for forming component (d). Carboxylic acid anhydrides, carboxylic acids, phenolic novolac resins, thiols (mercaptans), water, metal salts and the like may also be utilized as additional reactants in the preparation of the amine-epoxy adduct or to further modify the adduct once the amine and epoxy have been reacted.

Specific examples of suitable commercially available epoxy resins are those sold under the trade mark ARALDITE such as the MY-series (e.g. MY-0500, MY-0510, MY-0501, MY-720, MY-740, MY-750, MY-757, MY-790, MY-791, etc.), the GY-series (e.g. GY-240, GY-250, GY-260, GY-261, GY-282, etc.) (HUNTSMAN (PREVIOUSLY VANTICO A.G., Switzerland), DER-324, DER-332, DEN-431, DER-732 (DOW Chemical Co., USA), EPON 813, EPON 8021, EPON 8091, EPON 825, EPON 828, Eponex 1510, Eponex 1511 (SHELL Chemical Co. USA), PEP 6180, PEP 6769, PEP 6760 (Pacific Epoxy Polymers Inc. USA), NPEF-165 (Nan Ya Plastic Corporation, Republic of China), Ricopoxy 30, Ricotuff 1000-A, Ricotuff-1100-A, Ricotuff-1110-A (Ricon Resins Inc., USA), Setalux AA-8502, Setalux 8503 (AKZO Nobel, Netherlands), to mention just a few.

The amount of hardener (component (c)) should be at least the stoichiometric amount required to react with the cyclocarbonate component (a) and epoxy component (d).

The composition may also include one or more of the following:
 reinforcement fibres, e.g. glass-, carbon- or basalt fibres and mixtures thereof;
 toughening agents e.g. carboxy- or amino-terminated butadiene-nitrile rubber, ABS and MBS core-shell particles or copolymers, silicone rubbers, silicone core-shell particles;
 further fillers with a larger particle and/or reinforcing agents and/or pigments e.g. metal oxides, metal hydrates, metal hydroxides, metal aluminates, metal carbonates/sulphates, starches, talcs, kaolins, molecular sieves, fumed silica, organic pigments, etc.);
 diluents;
 solvents;
 thickeners and flow modifiers, e.g. thixotropic agents; and
 other additives commonly used in adhesives, sealants, paints/coatings, casting resins, cables, in shapable moulding materials and in finished mouldings or in composite materials.

The fillers (which includes substances capable of functioning as thixotropic or rheological control agents) that may optionally be present in the composition include any of the conventional inorganic or organic fillers known in the thermosettable resin art, including, for example, fibers other than glass fibers (e.g. wollastinite fibers, carbon fibers, ceramic fibers, aramid fibers), silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), alumina, clays, sand, metals (e.g., aluminum powder), microspheres other than glass microspheres (including thermoplastic resin, ceramic and carbon microspheres, which may be solid or hollow, expanded or expandable), and any of the other organic or inorganic fillers known in the epoxy resin field. The quantity of thixotropic agent(s) is desirably adjusted so as to provide a dough which does not exhibit any tendency to flow at room temperature.

Other optional components include diluents (reactive or non-reactive) such as glycidyl ethers, glycidyl esters, acrylics, solvents, and plasticizers, toughening agents and flexibilizers (e.g., aliphatic diepoxides, polyaminoamides, liquid polysulfide polymers, rubbers including liquid nitrile rubbers such as butadiene-acrylonitrile copolymers, which may be functionalized with carboxyl groups, amine groups or the like), adhesion promoters (also known as wetting or coupling agents; e.g., silanes, titanates, zirconates), colorants (e.g., dyes and pigments such as carbon black), stabilizers (e.g., antioxidants, UV stabilizers), and the like.

The present invention avoids environmentally damaging isocyanates and provides a cured product with beneficial physicochemical and mechanical properties, especially the avoidance of occluded gas bubbles that presently restricts the use of polyurethane-based materials.

The polyurethanes and polyurethane-epoxy hybrid materials containing nano-clays present superior physical and mechanical properties over their counterparts containing no nano-clays, particularly improved adhesive properties and reduced water absorption.

In addition, the introduction and dispersion in the nanoscale of modified nano-clays into non-isocyanate-based polyurethane and hybrid reaction mixtures with epoxy-containing were found unexpectedly to provide a significant catalytic effect in the crosslinking reaction between cyclocarbonate groups and the epoxy groups of components (a) and (d) with the amine groups of the hardener (c), resulting to significantly faster curing processes and substantially lower gel times. More particularly a study based on the gel times of various formulations of the type mentioned herein, revealed the potential of organoclays and/or mixtures of organoclays with cyclocarbonated resins as effective accelerators for the polyepoxy reaction. For example, a significant decrease in the gel time of a conventional system containing commercially available epoxide resin, MY-0510, and triethylene pentamine (TEPA) was recorded when the epoxide also included a highly reactive cyclocarbonated resin and a properly exfoliated organoclay and the resulting mixture was crosslinked with TEPA. The present invention also gives rise to a reduced gel time and also, in some instances a higher glass transition temperature.

Furthermore, the incorporation of nano-clays according to the present invention permits the preparation of non-isocyanate-based hybrid polyurethane-epoxy linear or network materials of enhanced physicochemical and mechanical properties by mixing compounds bearing cyclocarbonate groups with epoxy resins and subsequently crosslinking the mixture with amine(s). EP-A-1,070,733 states that it is impossible to prepare a non-isocyanate polyurethane-epoxy hybrid materials containing both epoxy and cyclocarbonate groups but we have not found this problematic when using nano-clays in the composition.

According to a further aspect of the present investigation, the polymeric compositions related to this invention can also include a solvent.

The compositions of the present invention can be made non-flammable by introducing flame-retardants.

The newly developed non-isocyanate-based polyurethane- and hybrid polyurethane-epoxy nanocomposites described in the present invention are especially useful in applications as adhesives, sealants, paints/coatings, casting resins, reinforcing or thixotropic agents, cables, in shapable moulding materials and in finished mouldings or composite materials.

In addition to the above-mentioned catalytic effect and the increased curing speeds and decreased gel times, the main advantages of introducing layered silicates into a conventional polymeric composition can be summarized as follows: a) they have a low cost, b) low loading levels (typically up to 10%) of layered silicates are typically required, c) safe handling due to the use of non-toxic raw materials d) they do not damage the environment, e) they are light weight, f) they provide materials of high modulus of elasticity and strength g) they decrease the moisture, solvent and gas permeability h) the silicates are transparent and therefore do not affect the appearance of the polymer, i) they provide flexibility, m) they provide enhanced flame retardancy.

BRIEF DESCRIPTION OF THE DRAWINGS/SCHEMES

Figure 6:
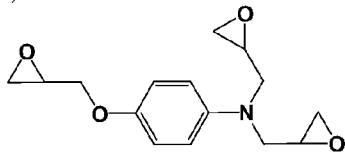
Figure 6:
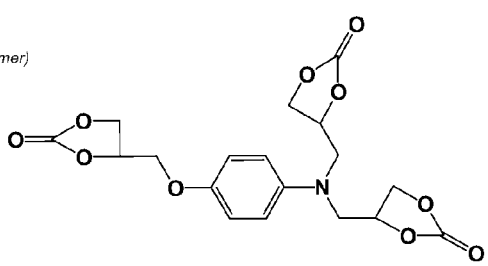
Figure 6:
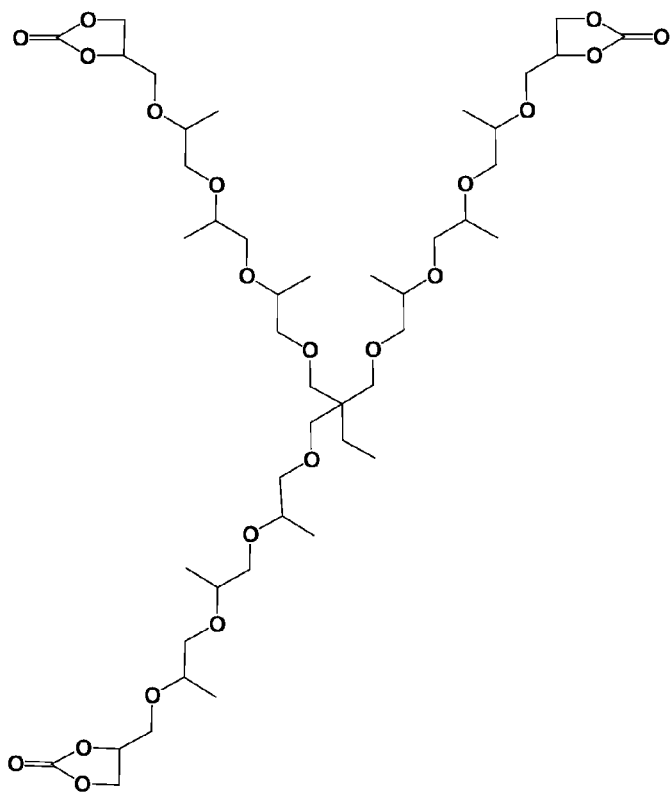

FIG. 6 Chemical structures of epoxy resin MY-0510 (represented as a monomer) and cyclocarbonate resins MY-0500CC (represented as a monomer) and L-803.

EXAMPLES

Raw Materials

The raw materials and their suppliers that were used in the Examples are set out in Table 1.

TABLE 1

| Material | Description | Supplier |
| --- | --- | --- |
| Cloisite Na⁺ | A natural nano-clay (Montmorillonite) | Southern Clays |
| Cloisite 25A ($d_{001}$ = 18.6 Å) | A nanoclay (montmorillonite) treated with a surface modifier (dimethyl, hydrogenated tallow, 2-ethylhexyl quaternary ammonium with a: methyl sulfate anion) | Southern Clays |

TABLE 1-continued

| Material | Description | Supplier |
|---|---|---|
| Nanofil 32 ($d_{001}$ = 18.0 Å), | A nano-clay treated with a surface modifier (stearylbenzyldimethyl-ammonium salt) | Süd Chemie |
| Montmorillonite K10 | Nano-clay | Aldrich Chemical Company |
| MY-0510 | epoxy resin (see FIG. 1), MW = 303, functionality = 3; | Huntsman (previously Vantico Ltd) |
| MY-0500CC | cyclocarbonate resin (see FIG. 1), MW = 462, functionality = 3 | Chemonol Ltd |
| Laprolate 803(L-803) | cyclocarbonate resin (see FIG. 1), MW = 957, functionality = 3, | Chemonol Ltd |
| triethylene pentamine (TEPA) | An amine; MW = 189, functionality: 7 towards epoxy resins and 2 towards cyclocarbonate resins | Aldrich Chemical Company |
| diethylene triamine (DETA) | An amine; MW = 103, functionality: 5 towards epoxy resins and 2 towards cyclocarbonate resins | Aldrich Chemical Company |
| Ethacure-100 | diethyltoluene diamine, MW = 178, functionality: 4 towards epoxy resins and 2 towards cyclocarbonate resins | Ethyl Chemicals Group |
| Arquad-DMHTB-75 | mixture of (a) 70-80% benzyl hydrogenated tallow chloride, (b) 1-4% alkyl trimethyl hydrogenated tallow chloride, (c) 10-20% Isopropanol and (d) 5-10% water | Akzo Nobel-Rockwood Additives |
| Benzyl trimethyl ammonium chloride | | Fluka |

Test Methods

Gel time measurements were carried out at 36° C. on a Micheler apparatus equipped with a digital temperature controller (acc.: ±0.1° C.).

Glass transition temperatures ($T_g$) A differential scanning calorimeter (DSC), DSC-2920 (TA Instruments) equipped with a high temperature cell was used to determine glass transition temperatures ($T_g$) (nitrogen atmosphere, heating rate: 10° C./min). Some glass transition temperatures were measured using dynamic mechanical analysis (DMA).

Dynamic mechanical analyses (DMA) A Rheometrics Dynamic Analyser RDA-700 with torsional rectangular fittings (specimens: 55 mm in length, 10 mm in width and 2 mm in thickness) was used for dynamic mechanical analyses (strain: ±1%, frequency 1 Hz).

Lap shear measurements at 25° C., were performed on an Instron 4467 (crosshead speed of 10 mm/min, substrates: aluminium cleaned only with acetone) according to ISO 4587.

Isothermal water uptake measurements were carried out at 20° C. (acc.: ±2° C.) and relative humidity 73% (acc.: ±2%). The samples were cured at room temperature (25° C.) for 1 day in a desiccator and then post-cured and dried at 60° C. for 2 days.

Example 1

Preparation of a Mixture of a Cyclocarbonate Resin with an Epoxy Resin 80 g of MY-0510 and 20 g of MY-0500CC were placed in a round bottom flask equipped with a mechanical stirrer, heating mantle and a digital temperature controller (acc. ±1° C.). The mixture was heated at 60° C. for 3 h under high shear (3000-3500 rpm). The solution was then removed from the flask and kept in a glass container. The solution was assigned the name: MY-20CC-80EP Examples 2-7

Preparation of Dispersions of Nano-Clays into Various Polymers

Solventless dispersions of Cloisite 25A (Southern Clays) and Nanofil32 Chemie), into various resins or polymerizable monomers were carried out via the following general procedure:

100 parts by weight of a resin or a resin mixture, as set out in see Table 2, was mixed with one of the aforementioned nano-clays (10 parts by weight) and placed in a round bottom flask equipped with a mechanical stirrer, heating mantle and a digital temperature controller (acc. ±1° C.). The mixture was heated at a temperature between 50 to 60° C. for 6 h under high shear (3-3500 rpm). The dispersed product was then removed from the flask and placed in a plastic container. Table 2, summarises the preparation of each of the dispersions (resin, nano-clay, temperature) and the product names assigned to them.

TABLE 2

| Example | Resin or Mixture of Resins | Nano-clay | Temperature (° C.) | Product name |
|---|---|---|---|---|
| 2 | L-803 | Cloisite 25A | 60 | D4408 |
| 3 | L-803 | Nanofil 32 | 60 | D3808 |
| 4 | MY-20CC-80EP* | Cloisite 25A | 60 | D4508 |
| 5 | MY-20CC-80EP* | Nanofil 32 | 60 | D3708 |
| 6 | MY-0510 | Cloisite 25A | 60 | D4208 |
| 7 | MY-0510 | Nanofil 32 | 60 | D3508 |

*See Example 1

Examples 8-15

Preparation of Mixtures of Nano-Clays into Various Polymers

Solventless dispersions of Cloisite 25A, Cloisite Na (Southern Clays), Nanofil32 Chemie), and Montmorillonite K10 in MY-0510 epoxy resin or MY-20CC-80EP were formed via the following general procedure:

100 parts by weight of MY-0510 resin or the resin mixture MY-20CC-80EP was hand-mixed for 5-10 min with a nano-clay (10 parts by weight) at ambient temperature, as detailed in Table 3.

TABLE 3

| Example | Resin or Mixture of Resins | Nano-clay | Temperature (° C.) | Product name |
|---|---|---|---|---|
| 8 | MY-0510 | Cloisite 25A | 25 | MEPOXY25A |
| 9 | MY-0510 | Cloisite Na | 25 | MEPOXYNa |
| 10 | MY-0510 | Nanofil 32 | 25 | MEPOXY32 |
| 11 | MY-0510 | Montmorillonite K10 | 25 | MEPOXYK10 |
| 12 | MY-20CC-80EP | Cloisite 25A | 25 | MEPPU25A |
| 13 | MY-20CC-80EP | Cloisite Na | 25 | MEPPUNa |

TABLE 3-continued

| Example | Resin or Mixture of Resins | Nano-clay | Temperature (° C.) | Product name |
|---|---|---|---|---|
| 14 | MY-20CC-80EP | Nanofil 32 | 25 | MEPPU32 |
| 15 | MY-20CC-80EP | Montmo-rillonite K10 | 25 | MEPPUK10 |

Examples for Non-Isocyanate-Based Polyurethanes and Polyurethane/Epoxy Hybrid Nanocomposite Formulations Examples 16-18

Preparation of Reference Formulations

A series of typical reference formulations representing non-isocyanate-based polyurethane (referred to hereafter as "RPU", standing for Reference Polyurethane) (Example 16), and polyurethane-epoxy hybrids (referred to hereafter as "RPUH1" and "RPUH2" standing for Reference Polyurethane Hybrid 1 and 2) were prepared (Examples 17 and 18); such formulations did not contain nano-clays. Table 4 summarizes the composition and the product names assigned to the reference formulations.

TABLE 4

| | Example | | |
|---|---|---|---|
| | 16 | 17 | 18 |
| | RPU | RPUH1 | RPUH2 |
| Resins and Hardeners | Weight (g) | | |
| L-803 | 100 | | |
| MY-20CC-80EP | | 100 | 100 |
| DETA | 16.2 | | |
| TEPA | | 35.4 | 14 |
| Ethacure-100 | | | 35 |

Procedure:
Reference formulations RPU, RPUH and RPUH2 were prepared as follows:
$1^{st}$ step: Addition of all the components.
$2^{nd}$ step: Thorough mixing.
The aforementioned reference compositions were cured as follows yielding different hybrid materials:
RPU:
Room temperature/1 day (RPU-1)
Room temperature/4 days (RPU-4) (sample only for comparative FT-IR studies)
Room temperature/8 days (RPU-8)
Room temperature 1 day and subsequently at 60° C./4 h (RPU-1-60-4)
RPUH1:
Room temperature/1 day (RPUH1-1)
Room temperature/4 days (RPUH1-4)
Room temperature/1 day and subsequently at 60° C./4 h (RPUH1-1-60-4)
Room temperature/1 day and subsequently at 160° C./4 h (RPUH1-1-160-4)
RPUH2:
Room temperature/1 day and subsequently at 120° C./4 h (RPUH2-1-120-4)
The gel times (Micheler test) and isothermal water uptake measurements of the cured reference resin formulations RPU, RPUH1 and RPUH2 over the course of 60 days of are presented in Table 5.

TABLE 5

| Cured Reference Samples | Gel time (min) | Water Uptake (%) |
|---|---|---|
| RPU | 155 | 25.90 |
| RPUH1 | 30 | 11.37 |
| RPUH2 | 90 | 0.88 |

Water uptake is a reliable measure for determining moisture (water) permeability of a polymer. The higher the water uptake, the higher is the affinity of the polymeric matrix to water molecules and consequently the higher the moisture permeability of this particular polymer.

The following Table 6 summarises some of the properties of the reference compositions.

TABLE 6

| Cured Reference Samples | Example | $T_g$ (° C.) | Young's Storage Modulus @ 30° C. (MPa) | Lap Shear Strength (MPa) | Deformation at maximum load (mm) |
|---|---|---|---|---|---|
| RPU-1 | 16 | $-25^a$ | n.d. | 0.74 | 1.34 |
| RPU-8 | 16 | $-20^a$ | n.d. | 1.00 | 0.58 |
| RPU-1-60-4 | 17 | $-19^a$ | n.d. | 1.04 | 0.45 |
| RPUH1-1 | 17 | $69^b$ | 1024 | 2.63 | 0.13 |
| RPUH1-4 | 17 | $71^b$ | 1097 | 3.76 | 0.15 |
| RPUH1-1-60-4 | 17 | $99^b$ | 1014 | 3.75 | 0.17 |
| RPUH1-1-160-4 | 17 | $113^b$ | 1497 | n.d. | n.d. |
| RPUH2-1-120-4 | 18 | $147^b$ | 920 | n.d. | n.d. |

$^a$Determined by DSC,
$^b$Determined by DMA

Examples 19-21

Nanoparticle-containing non-isocyanate-based polyurethane—("NPU", Example 19) and Nanoparticle-containing hybrid polyurethane-epoxy nanocomposite polymer compositions (NPUH1 and NPUH2, Examples 20 and 21, respectively) according to the present invention were prepared according to the formulation in Table 7.

TABLE 7

| | Example | | |
|---|---|---|---|
| | 19 | 20 | 21 |
| | NPU | NPUH1 | NPUH2 |
| Resins and Hardeners | Weight (g) | | |
| D4408 (L-803 + Cloisite 25A-see Table 2) | 110 | | |
| D4508 (MY-20CC-80EP + Cloisite 25A-see Table 2) | | 110 | 110 |
| DETA | 16.2 | | |
| TEPA | | 35.2 | 14 |
| Ethacure-100 | | | 35 |

Procedure:
Formulations NPU, NPUH1 and NPUH2 were prepared as follows:
$1^{st}$ step: Addition of all the components.
$2^{nd}$ step: Thorough mixing.
The aforementioned compositions were cured as follows yielding different nanocomposite materials:
NPU:
Room temperature/1 day (NPU-1)
Room temperature/4 days (NPU-4)
Room temperature/1 day and subsequently at 60° C./4 h (NPU-1-60-4)

NPUH1:
Room temperature/1 day (NPUH1-1)
Room temperature/4 days (NPUH1-4)
Room temperature/1 day and subsequently at 60° C./4 h (NPUH1-1-60-4)
Room temperature/1 day and subsequently at 160° C./4 h (NPUH1-1-160-4)
NPUH2:
Room temperature/1 day and subsequently at 120° C./4 h (NPUH2-1-120-4)

The gel times (Micheler test) and isothermal water uptake measurements over 60 days of the cured formulations NPU, NPUH1 and NPUH2, are presented in Table 8.

TABLE 8

| Cured Nanocomposite Samples | Gel time (min) | Water Uptake (%) |
|---|---|---|
| NPU | 135 | 20.56 |
| NPUH1 | 18 | 1.77 |
| NPUH2 | 60 | 0.75 |

By comparing Tables 5 and 8, it can be seen that the presence of nano-clays in NPU, NPUH1, and NPUH2 reduces gel time and reduces water uptake as compared to the corresponding reference samples that do not contain nanoparticles, RPU, RPUH1, and RPUH2;

The following Table 9 summarizes some of the properties of the nano-particle compositions of the present invention.

TABLE 9

| Cured Nanocomposite Samples | $T_g$ (° C.) | Young's Storage Modulus @ 30° C. (MPa) | Lap Shear Strength (MPa) | Deformation at maximum load (mm) |
|---|---|---|---|---|
| NPU-1 | −10[a] | n.d. | 1.37 | 0.96 |
| NPU-4 | −9[a] | n.d. | 1.51 | 0.51 |
| NPU-1-60-4 | −9[a] | n.d. | 1.78 | 0.43 |
| NPUH1-1 | 69[b] | 912 | 2.68 | 0.13 |
| NPUH1-4 | 74[b] | 1190 | 3.46 | 0.14 |
| NPUH1-1-60-4 | 112[b] | 1013 | 5.19 | 0.23 |
| NPUH1-1-160-4 | 154[b] | 1803 | n.d. | n.d. |
| NPUH2-1-120-4 | 143[b] | 1646 | n.d. | n.d. |

[a]Determined by DSC,
[b]Determined by DMA

By comparing the results in Table 9 for the cured resins containing nanoparticles with the results in Table 6 for the reference cured resins (RPU) that do not contain nanoparticles, it can be seen that the resins containing nanoparticles generally have better physical properties. The presence of the nano-clay decreased the gel time by 13%, as compared to the reference RPU formulation that contained no nano-clay and also the use of nano-clays:
- increases the glass transition temperature ($T_g$),
- improves the lap shear strength, which is directly related to adhesion properties, and
- reduces deformation.

Examples showing the Catalytic Activity of Nanoclays on Cyclocarbonate Resins and Cyclocarbonate-Epoxy Resins Example 22

Preparation of Reference Epoxy Formulation (RPE)

5 g of MY-0510 were hand-mixed for 2 min with 1.33 g of TEPA at ambient temperature. The gel time of this formulation was 106 min.

Examples 23-34

Non-isocyanate-based polyurethane- and hybrid polyurethane-epoxy nanocomposite polymer compositions according to the present invention were prepared according to the formulations presented in Table 10. The gel times of all formulations was measured after 2 minutes of hand mixing of their ingredients. For comparative reasons, the data of Examples 20 (NPUH1, in Table 7) and 22 (RPE) were also included as Example 31 and RPE in Table 10.

TABLE 10

| Components of polymeric compositions (with amounts indicated in grams) | Example Number | | | | | | | | | | | | |
|---|---|---|---|---|---|---|---|---|---|---|---|---|---|
| | RPE | 23 | 24 | 25 | 26 | 27 | 28 | 29 | 30 | 31 | 32 | 33 | 34 |
| MY-0510 | 5.00 | | | | | | | | | | 5.00 | 5.00 | 5.00 |
| Example 8 (MY-0510 + Cloisite 25A) | | 5.50 | | | | | | | | | | | |
| Example 9 (MY-0510 + Cloisite Na) | | | 5.50 | | | | | | | | | | |
| Example 11 (MY-0510 + Montmorillonite K10) | | | | 5.50 | | | | | | | | | |
| Example 7 (MY-0510 + Nanofil 32) | | | | | 5.50 | | | | | | | | |
| Example 6 (MY-0510 + Cloisite 25A) | | | | | | 5.50 | | | | | | | |
| Example 1 (MY-20CC-80EP) | | | | | | | 4.00 | | | | | | |
| Example 12 (MY-20CC-80EP + Cloisite 25A) | | | | | | | | 4.44 | | | | | |
| Example 13 (MY-20CC-80EP + Cloisite Na) | | | | | | | | | 4.44 | | | | |
| Example 4 (MY-20CC-80EP + Cloisite 25A) | | | | | | | | | | 4.44 | | | |
| TEPA | 1.33 | 1.33 | 1.33 | 1.33 | 1.33 | 1.33 | 1.42 | 1.42 | 1.42 | 1.42 | 1.33 | 1.33 | 1.33 |
| Arquad-DMHTB-75 | | | | | | | | | | | 0.10 | 0.20 | |
| Benzyltrimethyl ammonium chloride | | | | | | | | | | | | | 0.10 |
| Gel time (min) | 106 | 85 | 93 | 93 | 75 | 88 | 30 | 32 | 32 | 18 | 95 | 95 | 95 |
| % Decrease in gel time of the RPE | n.a. | 20 | 12 | 12 | 29 | 17 | 72 | 70 | 70 | 83 | 10 | 10 | 10 |

As can be seen from Table 10, the introduction of nanoclays into both conventional cyclocarbonate-based polyurethane compositions and cyclocarbonate/epoxy-based compositions (Examples 23-27 and 29-31) resulted in substantially decreased gel time (even up to 83% upon compared to RPE) as compared to those compositions without the nanoclay (Examples RPE, 28 and 32-34).

From the data presented in Table 10, it is clear that curing can be accelerated by 12-20% by introducing nanoclays (compare RPE with Examples 23-27), showing that the nanoclays have a catalytic effect.

In T. Lan, P. D. Kaviratna, T. J. Pinnavaia, *Chem. Mater.* 7, 2144-2150, 1995 and Z. Wang, T. J. Pinnavaia, *Chem. Mater.* 10, 1820-1826, 1998, it has been reported that acidic primary onium ions when they are ion-exchanged for the inorganic cations of the parent layered silicates catalyze intergallery epoxide polymerization process in the presence of an amine curing agent. However, it can be seen from the results in Table 10 (see Examples 24 and 25) that even natural non-modified nano-clays can catalyze the reaction of an epoxy resin with an amine as these two formulations presented lower gel times (12%) than the reference formulation RPE. Differences in the catalytic activity of various commercially available nanoclays cannot be excluded. The formulation of Example 26 presented decreased gel times compared with the formulations of Examples 23-25 where the organoclays where simply hand mixed with the curable mixture. In addition, the Example 23 formulation presented lower gel time than the compositions of Examples 32-34.

When epoxides are formulated with cyclocarbonated resins, the gel time is significantly decreased compared to RPE. More particularly, the use of a mixture of a cyclocarbonate resin, an epoxy resin and an amine (calculated to react with both resins) resulted to a dramatic decrease of the gel time (compare the results of RPE with that of Example 28 in Table 10).

Without being bound to any particular theory for the low gel time of the mixture of cyclocarbonated and epoxy resins and a nanoclay cured with an amine hardener, as shown in Examples 29 to 31, it is believed that it is brought about as follows: Two main crosslinking reactions can take place when curing a mixture of cyclocarbonated and epoxy resins with an amine hardener: a) the reaction of the carbonyl of the 1,3-dioxolan-2-one ring with the amine, resulting to a polyurethane group (polyurethane reaction) and b) the reaction of the epoxide with the amine, resulting in a polyepoxy (polyepoxy reaction). Thus the presence of cyclocarbonate and epoxy resins together with amine hardeners leads to the formation of a copolymer or an interpenetrated network (IPN). It is believed that, due to its short induction time, the polyurethane reaction proceeds faster than the epoxy reaction; both reactions are exothermic and, depending on the reaction mass and the initial curing temperature, the polyurethane reaction will generally proceed until a temperature is reached at which the polyepoxy reaction is triggered, when the temperature will rise more quickly, thereby further increasing the rate of curing. The natural or modified nanoclays appear to catalyse not only the reaction of the carbonyl of the cyclocarbonate (1,3-dioxolan-2-one) ring with the hardener (e.g. aliphatic amine) but also the reaction of the epoxide with the hardener (amine), giving a reduced gel time, exemplified particularly of Example 31, where the gel time (18 min) was 83% less of the gel time of RPE (106 min).

Generally, the nanofillers need not be dispersed at a nanoscale in order for the catalysis to be effective but generally some sort of dispersion is preferable in order to produce the full benefit of the improved physical properties of the present invention.

Example 35

Figure 1:
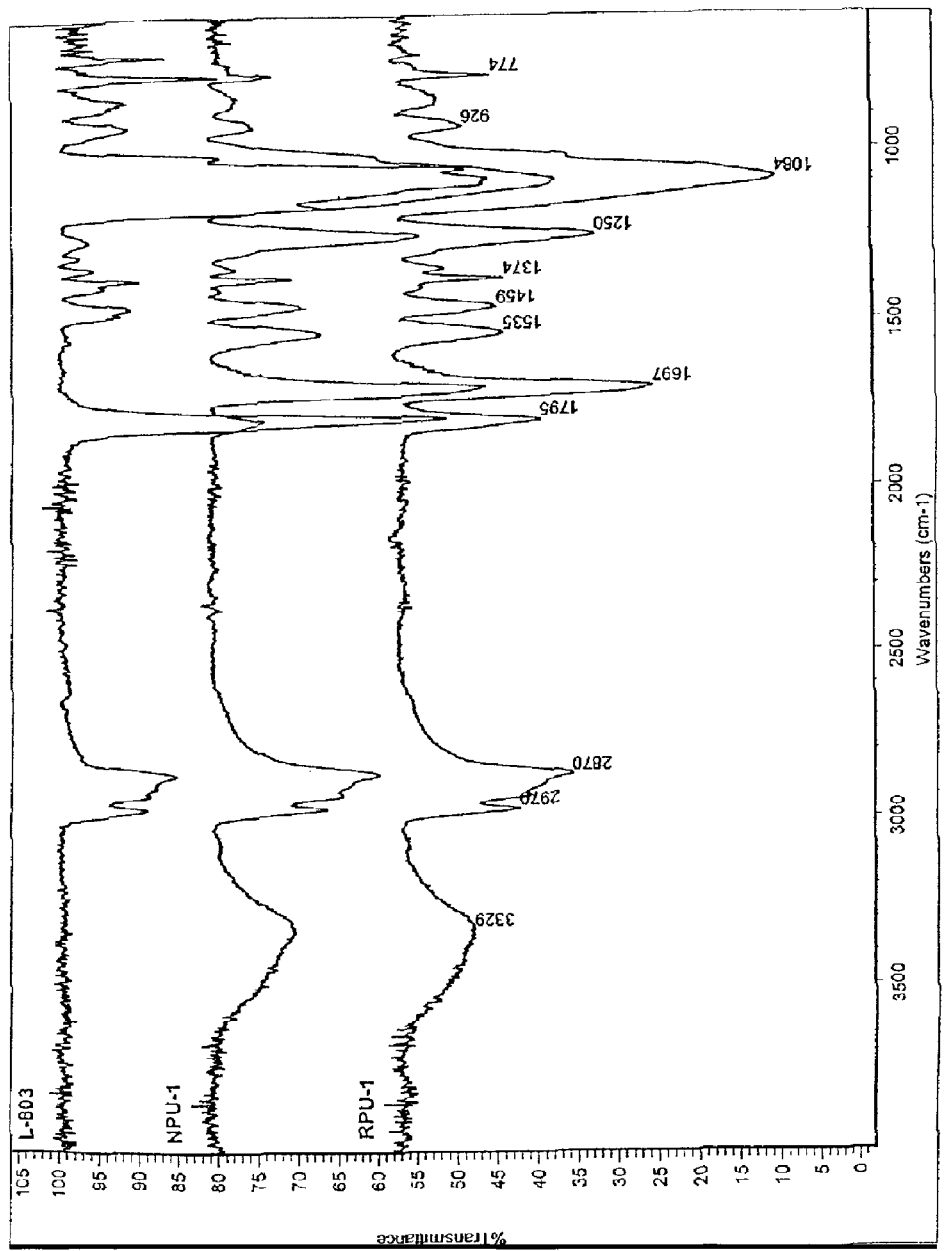
FIG. 1 is a FT-IR spectra of L-803, RPU-1 and NPU-1.

FIG. 1 is the FT-IR spectra of:
1. L-803,
2. RPU-1 (which is L-803+DETA, see Example 16 in Table 4 after 1 day cure) and
3. NPU-1 (which is L-803+Cloisite 25A+DETA, see Example 19 in Table 7, after 1 day cure)

Figure 2:
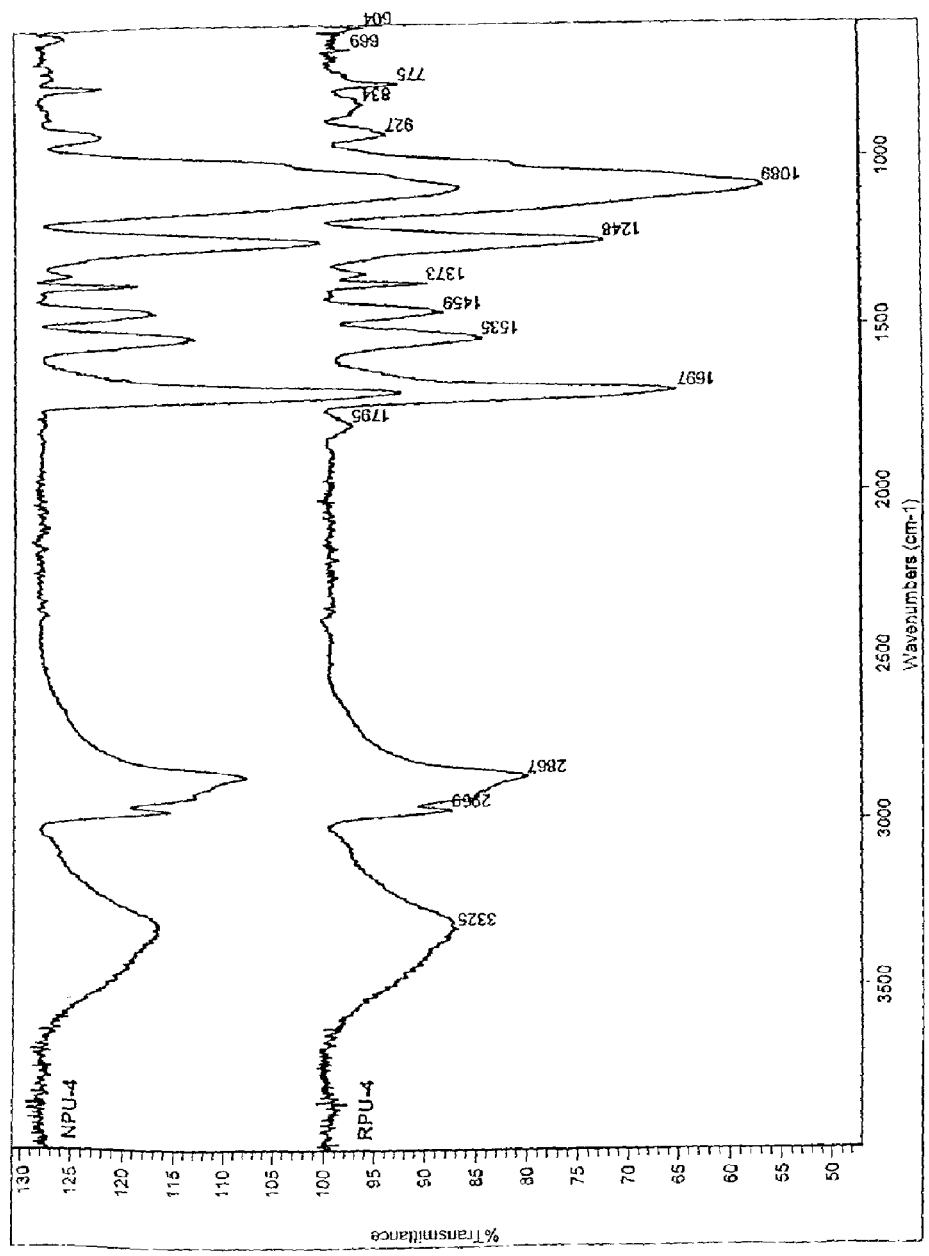
FIG. 2 is a FT-IR spectra of RPU-4 and NPU-4 (compositions RPU-4 and NPU-4 are essentially the same to RPU-1 and NPU-1 respectively (the FT-IR of which are presented in FIG. 1), but correspond to different curing time (4 days at ambient temperature)

FIG. 2 is the FT-IR spectra of:
1. RPU-4 (which is L-803+DETA, see Example 16 in Table 4 after 4 days cure) and
2. NPU-4 (which is L-803+Cloisite 25A+DETA, see Example 19 in Table 7, after 4 days cure)

FIGS. 1 and 2 provide clear evidence of the substantially decreased reaction time when the compositions contain nanoclays. The absorption at 1795 $cm^{-1}$ attributed to the carbonyl of the cyclocarbonate groups (1,3-dioxolan-2-one rings) (see FT-IR spectrum of L-803 resin), is almost three times less in the FT-IR spectrum of NPU-1 as compared to that of the reference polyurethane RPU-1. Moreover, after 4 days curing at ambient temperature NPU-4 does not present any absorption at 1795 $cm^{-1}$ (indicative of complete reaction of the cyclocarbonate groups with the amine crosslinker) whilst RPU-4 still presents some unreacted cyclocarbonate groups. The reference polyurethane RPU is fully crosslinked (no absorption at 1795 $cm^{-1}$) after 7-8 days at ambient temperature.

Example 36

Figure 3:
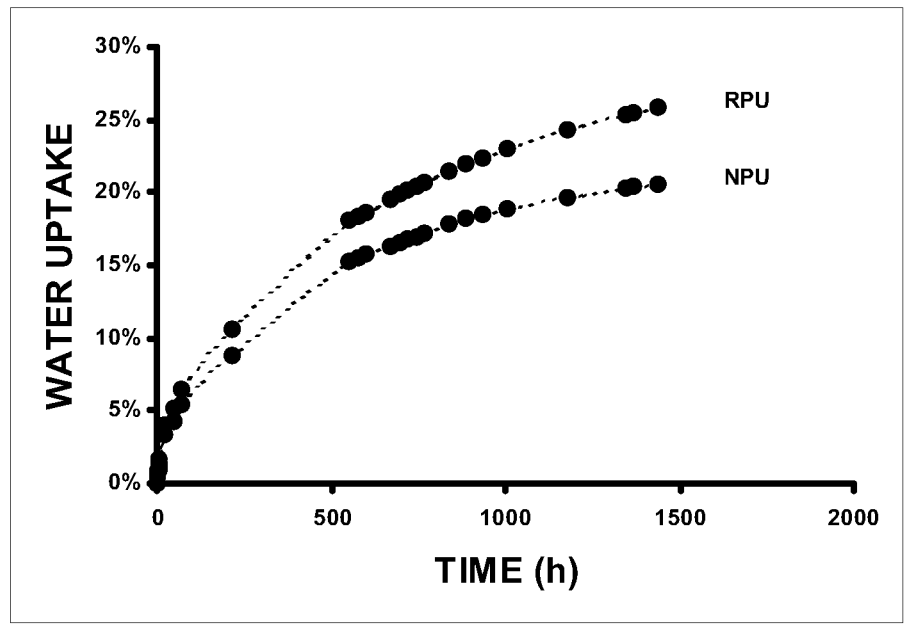
FIG. 3 is a graph showing the isothermal water uptake of two compositions (RPU and NPU).
Figure 4:
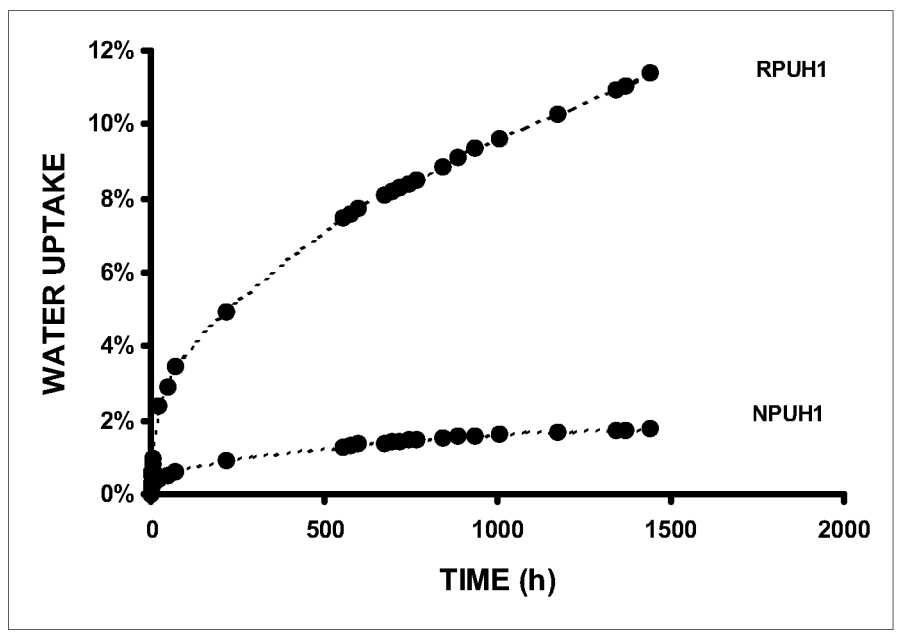
FIG. 4 is a graph showing the isothermal water uptake of two compositions after they have been cured for 1 hour (RPUH1 and NPUH1)
Figure 5:
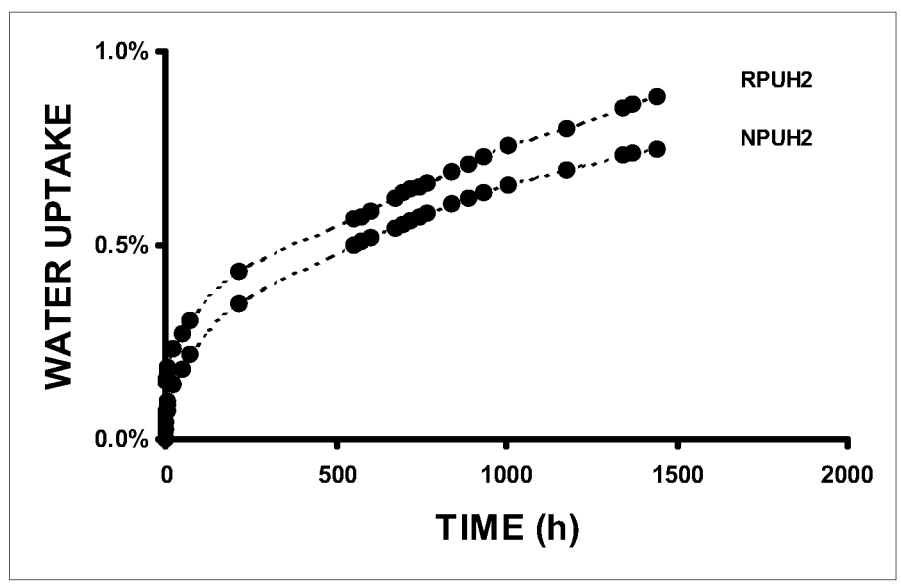
FIG. 5 is a graph showing the isothermal water uptake of the two compositions of FIG. 4 but after they have been cured for 2 hours (RPUH-2 and NPUH2.

Isothermal water uptake is a measure for addressing the moisture permeability of polymers; the isothermal water uptake of compositions RPU and NPU; RPUH1 and NPUH1; and RPUH2 and NPUH2 was measured over time and the results are shown in FIGS. 3 to 5. Surprisingly, in all cases, the formulations containing the nano-clays have substantially lower water permeability by approx. 14-85% w/w which is directly attributed to the organoclays; it is believed that the introduction of the organoclays into the polymeric network results in the formation of an internal barrier hindering the penetration of the water molecules into the matrix and decreases the capability of the polar atoms/groups (oxygens, hydroxyls, imino, urethane —NH, etc.) present in the matrix to attract water molecules via the formation of hydrogen bonds. After isothermal moisture absorption for 1440 h (60 days), NPUH2 presented the lowest water permeability, only 0.75% and the RPU the highest (25.90%).

The invention claimed is:

1. A non-isocyanate based polyurethane obtained from the reaction of:

(a) one or more polymerisable organic materials having at least one cyclocarbonate group;

(b) at least one nano-clay having a platelet thickness of less than 25 Å and an aspect ratio higher than 10 or a nanocomposite formed from the nano-clay;

(c) at least one hardener; and optionally (d) a compound containing one or more epoxy groups.

2. The non-isocyanate based polyurethane of claim 1 wherein component (a) is a compound of formula I:

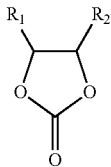
(I)

wherein $R_1$ and $R_2$ are each independently hydrogen, or a linear or branched, or cyclic, saturated or unsaturated group optionally substituted with one or more heteroatoms, oxygen-containing groups or nitrogen-containing groups.

3. The non-isocyanate based polyurethane of claim 1 wherein component (b) is present in an amount of from 0.1 to 95% w/w based on the total weight of the composition.

4. The non-isocyanate based polyurethane of claim 1 wherein component (b) is present in an amount of from 4 to 20% w/w based on the total weight of the composition.

5. The non-isocyanate based polyurethane of claim 1 wherein the nano-clay has aspect ratio higher than 50.

6. The non-isocyanate based polyurethane of claim 1 wherein the thickness of the nano-clay platelets is less than 10 Å.

7. The non-isocyanate based polyurethane of claim 1 wherein the nano-clay is a natural or modified bentonite, saponite, hectorite, montmorillonite or synthetic mica fluoride.

8. The non-isocyanate based polyurethane of claim 1 wherein the nano-clay is a natural or modified montmorillonite.

9. The non-isocyanate based polyurethane of claim 1 additionally containing one or more reinforcement fibres and/or one or more toughening agents.

10. The non-isocyanate based polyurethane of claim 1 additionally containing one or more fillers and/or one or more pigments.

11. The non-isocyanate based polyurethane of claim 1 additionally containing one or more drying agents, and/or one or more stabilizers, and/or one or more surface tension modifiers.

12. The non-isocyanate based polyurethane of claim 1 additionally containing a solvent or a solvent mixture.

13. The non-isocyanate based polyurethane of claim 1 additionally containing a diluent or a diluent mixture.

* * * * *